US012351143B2

(12) United States Patent
Stanojkovski et al.

(10) Patent No.: US 12,351,143 B2
(45) Date of Patent: Jul. 8, 2025

(54) METHOD FOR OPERATING A BRAKE SYSTEM WITH AN INTEGRATED PARKING BRAKE, AND BRAKE SYSTEM

(71) Applicant: Continental Teves AG & Co. OHG, Frankfurt am Main (DE)

(72) Inventors: Aleksandar Stanojkovski, Kleinostheim (DE); Serge Biegler, Darmstadt (DE); Michael Wintzer, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 365 days.

(21) Appl. No.: 17/771,310

(22) PCT Filed: Oct. 26, 2020

(86) PCT No.: PCT/EP2020/080041
§ 371 (c)(1),
(2) Date: Apr. 22, 2022

(87) PCT Pub. No.: WO2021/078997
PCT Pub. Date: Apr. 29, 2021

(65) Prior Publication Data
US 2022/0363233 A1 Nov. 17, 2022

(30) Foreign Application Priority Data
Oct. 24, 2019 (DE) ..................... 10 2019 216 429.3

(51) Int. Cl.
B60T 13/74 (2006.01)
B60T 7/04 (2006.01)
B60T 13/66 (2006.01)

(52) U.S. Cl.
CPC ............ *B60T 13/745* (2013.01); *B60T 7/042* (2013.01); *B60T 13/662* (2013.01); *B60T 2270/82* (2013.01)

(58) Field of Classification Search
CPC ...... B60T 7/042; B60T 13/662; B60T 13/745; B60T 2270/82
(Continued)

(56) References Cited

U.S. PATENT DOCUMENTS 8,103,421 B2    1/2012  Kondo et al.
10,173,653 B2*  1/2019  Biller ................. B60T 8/172
(Continued)

FOREIGN PATENT DOCUMENTS

CN    102947150 A    2/2013
CN    103038110 A    4/2013
(Continued)

OTHER PUBLICATIONS

German Search Report dated Jun. 29, 2020 for the counterpart German Patent Application No. 10 2019 216 429.3.
(Continued)

*Primary Examiner* — Christopher P Schwartz

(57) ABSTRACT

A method for operating a brake system, which comprises hydraulically actuatable wheel brakes with brake linings; a brake fluid reservoir; a master brake cylinder; a pressure supply device with a pressure piston that can be moved into a pressure chamber; an integrated parking brake, wherein, in a normal operating mode, brake pressure is actively built up in the wheel brakes by means of the pressure supply device, and wherein, in a parking operating mode, the integrated applies the brake linings of at least two wheel brakes, and wherein, when the integrated parking brake is released, the application of the linings is withdrawn again, wherein after the integrated parking brake has been released, the brake (Continued)

fluid volume displaced by the integrated parking brake is taken into consideration for the subsequent operation in the normal operating mode.

19 Claims, 4 Drawing Sheets

(58) Field of Classification Search
USPC ......... 303/3, 10, 11, 20, 115.1, 115.2, 116.1, 303/116.2
See application file for complete search history.

(56) References Cited

U.S. PATENT DOCUMENTS

| | | | |
|---|---|---|---|
| 2009/0133973 A1 | 5/2009 | Shibata | |
| 2012/0029785 A1* | 2/2012 | Loos | B60T 8/885 702/50 |
| 2013/0147260 A1 | 6/2013 | Loos | |
| 2013/0184954 A1 | 7/2013 | Treppenhauer | |
| 2013/0213025 A1 | 8/2013 | Linden | |
| 2013/0213746 A1 | 8/2013 | Peortgen et al. | |
| 2013/0226426 A1 | 8/2013 | Baehrle-Miller | |
| 2013/0325278 A1 | 12/2013 | Bieltz et al. | |
| 2015/0166024 A1 | 6/2015 | Biller | |
| 2016/0009263 A1* | 1/2016 | Feigel | B60T 11/224 303/15 |
| 2016/0039398 A1 | 2/2016 | Roll et al. | |
| 2018/0029573 A1 | 2/2018 | Englert et al. | |
| 2019/0331221 A1 | 10/2019 | Shirakawa | |

FOREIGN PATENT DOCUMENTS

| | | | | |
|---|---|---|---|---|
| CN | 103079920 A | | 5/2013 | |
| CN | 103124660 A | | 5/2013 | |
| CN | 103249614 A | | 8/2013 | |
| CN | 104159796 A | | 11/2014 | |
| CN | 105050872 A | | 11/2015 | |
| DE | 102008058711 A1 | | 9/2009 | |
| DE | 102010040563 A1 | | 3/2012 | |
| DE | 102011083171 A1 | | 3/2012 | |
| DE | 102013203189 A1 | | 9/2013 | |
| DE | 102016203117 A1 | | 8/2017 | |
| DE | 102016213666 A1 | | 2/2018 | |
| DE | 102016218022 A1 | * | 3/2018 | ............. B60T 17/22 |
| DE | 102019205614 A1 | | 10/2019 | |
| EP | 2822822 A2 | | 1/2015 | |
| JP | H08198070 A | | 8/1996 | |
| JP | 2007132392 A | | 5/2007 | |
| KR | 20130102075 A | | 9/2013 | |

OTHER PUBLICATIONS

The International Search Report and the Written Opinion of the International Searching Authority mailed on Feb. 4, 2021 for the counterpart PCT Application No. PCT/EP2020/080041.

Chinese First Office Action dated Apr. 26, 2023 for the counterpart Chinese Patent Application No. 202080073837.2 and DeepL translation of same.

Notice to Comment mailed on Aug. 31, 2023 for the Korean Patent Application No. 10-2022-7009671 and DeepL translation of same.

* cited by examiner

METHOD FOR OPERATING A BRAKE SYSTEM WITH AN INTEGRATED PARKING BRAKE, AND BRAKE SYSTEM

CROSS-REFERENCE TO RELATED APPLICATION

This U.S. patent application claims the benefit of PCT patent application No. PCT/EP2020/080041, filed Oct. 26, 2020, which claims the benefit of German patent application No. 10 2019 216 429.3, filed Oct. 24, 2019, both of which are hereby incorporated by reference.

TECHNICAL FIELD

The invention relates to a brake system and a method for operating the brake system.

BACKGROUND

Brake systems can have an integrated parking brake (IPB) which, when the motor vehicle is parked, increases the brake fluid volume in at least two wheel brakes by conveying brake fluid, and thereby increases the wheel brake pressure. The brake fluid volume is enclosed in the corresponding wheel brakes until the parking brake is released. This additional volume is released when the parking brake is released.

There is a hydraulic dependency between the parking brake and the electrohydraulic brake system with the service brake. The actuators of both brakes have an influence on the brake volume, resulting in interactions. When the parking brake applies the brake linings of a wheel brake, a follow-up flow of brake fluid into the wheel brake occurs. The brake fluid volume in the wheel brake thus increases. If the parking brake is released, this volume is released again and exits the brake.

The general problem is that the volume displaced by the parking brake propagates in the hydraulic brake system. If, for example, the inlet valves at the wheels of the rear axle are closed while the parking brake is released, this volume displacement has a direct effect on this wheel pressure. If the brake system is operated in the "by-wire" mode, in which the isolation valves that separate the pressure supply device from the master brake cylinder are closed, this volume has a direct effect on the pressure-volume balance of the system pressure.

In concrete terms, this leads to the following specific problems. The volume displaced by the parking brake is not taken into consideration by the brake system. This results in problems because the additional volume cannot be depleted by the pressure supply device when the isolation valves or sequence valves that hydraulically isolate the pressure supply device from the brake circuits are closed. A depletion of residual pressure via normally closed outlet valves of the wheel brakes is very loud and can irritate the driver.

The hydraulic pressure model can be a major input variable of the wheel pressure control of the brake system.

The pressure model determines the wheel pressure taking into consideration admission pressure and the volume flow on the basis of the switching times of the inlet and outlet valves.

Since the integrated parking brake intervenes as an additional actuator in the action chain at the wheel, the pressure model is incorrect under these circumstances. When the integrated parking brake is released, additional brake volume is moved into the wheel. This has the result, if the inlet valves at this wheel are closed, of overbraking of the wheel, and in some cases even locking of the brakes of the vehicle. The reason for this is that the wheel pressure controller does not deplete the volume injected by the integrated parking brake, and overbrakes the rear axle.

A superposition of the release of the integrated parking brake with TCS (Traction Control System) leads to an undeterminable pressure build-up at the rear axle, because the inlet valves at the rear axle have been closed by the TCS. The pressure model calculates incorrectly because it does not take the integrated parking brake into consideration as an actuator or pressure source. The result is that the wheel pressure controller does not deplete the volume injected by the integrated parking brake, and overbrakes the rear axle.

One possible solution to these problems is for the outlet valves at these wheels to be opened "blindly" in order to dissipate the residual pressure. However, the "blindness" has the result that the pressure values do not correspond to the demanded values.

The volume displaced by the integrated parking brake should not lead to noise, vibration and harshness (NVH) problems or quality problems or to overbraking.

An improved method for operating an electrohydraulic brake system with an integrated parking brake, in the case of which the abovementioned problems are reduced or avoided entirely. It is also sought to specify a corresponding brake system.

SUMMARY

A method for operating a brake system comprises hydraulically actuatable wheel brakes with brake linings; a brake fluid reservoir; a pressure supply device with a pressure piston that can be moved into a pressure chamber; an integrated parking brake, wherein, in a normal operating mode, brake pressure is actively built up in the wheel brakes by means of the pressure supply device, and wherein, in a parking operating mode, the integrated parking brake applies the brake linings of at least two wheel brakes, and wherein, when the integrated parking brake is released, the application of the linings is withdrawn again.

With regard to the method, this object is achieved in that, after the integrated parking brake has been released, the brake fluid volume displaced by the integrated parking brake is taken into consideration for the subsequent operation in the normal operating mode.

The problems described above can be avoided by regarding the hydraulic brake system as including the volume that has been displaced by the integrated parking brake. The fact that the volume is taken into consideration means for example that the operation of the brake system is adjusted to account for the excess volume that is present, and not to a "blind" drainage of brake fluid through the outlet valves as described above.

When the motor vehicle is woken up and/or when the pressure piston is moved back out of the pressure chamber with the integrated parking brake activated, the standby position to be assumed by the pressure piston of the pressure supply device is advanced in the direction of the pressure chamber by a compensation travel such that the corresponding volume corresponds to the parking brake volume, whereby a volume reserve is created in the pressure supply device. This means for example that the pressure piston itself should be capable of taking in the brake volume of the parking brake until an unpressurized state is attained.

Here, "waking up" refers for example to the brake system being set into a state in which the valves are ready to switch and a transition to a normal operating state can take place.

The retraction of the pressure piston out of the pressure chamber takes place for example when the driver releases a brake pedal, or when a driver-independent automatic braking operation is ended.

After the integrated parking brake has been released with the hydraulic connection to the brake fluid reservoir closed, the original standby position of the pressure piston may be substantially assumed again.

The normal operating state corresponds for example to the service brake function while the vehicle is being driven.

The compensation travel may be an empirical value that has been determined for example by way of a series of measurements, or else determined by way of specific measurement of variables that are a measure of the brake fluid volume, such as flow velocity, flow cross section and flow time.

In one embodiment, the brake fluid volume displaced by the integrated parking brake is determined and is taken into consideration in at least one stored pressure-volume characteristic curve of the brake system. This may be performed globally or locally in relation to the brake system, as discussed below. The determination may be performed by calculation, or alternatively a predetermined value may also be used.

The brake fluid volume displaced by the integrated parking brake may be taken into consideration in the pressure model of the respective wheel brake. It is thus taken into consideration locally in each wheel brake in the pressure/volume characteristic curve thereof.

For this purpose, at least one of the wheel brake variables from the following group may be taken into consideration: admission pressure, caliper dimension, inlet valve state, isolation valve state, outlet valve state.

If the pressure model indicates an excess of brake fluid in a wheel brake, the wheel brake pressure may be reduced in this wheel brake by opening of an outlet valve, such that the excess of brake fluid is depleted.

In one embodiment, the brake fluid volume displaced by the integrated parking brake is calculated and is incorporated into a stored pressure-volume characteristic curve, wherein a comparison is performed with the aid of this, and wherein this new pressure-volume characteristic curve is used in monitoring of wheel volume deviations. This pressure-volume characteristic curve may relate to the system pressure provided by the pressure supply device, which corresponds to the pressure prevailing in the pressure chamber of the pressure supply device.

With regard to the brake system, the above-stated object is achieved with an open-loop and closed-loop control unit in which a method described above is implemented in hardware and/or software.

In one embodiment, a brake pedal is provided, which is coupled to a pressure piston of the master brake cylinder by a pedal coupling rod. In this case, in a fallback level, the driver can use muscle power to build up brake pressure in the wheel brakes. In normal operation ("by wire"), when the brake pedal is actuated, a simulator is actuated and the driver braking demand is detected by a driver braking demand detection means, in particular a pedal travel sensor. In other embodiments, the brake pedal is not mechanically coupled to the master brake cylinder. The driver braking demand is detected by the driver braking demand detection means and is then transmitted by wire (as a signal) to the open-loop and closed-loop control unit. The brake system thus comprises a brake pedal, which may be mechanically coupled to the master brake cylinder or is connected exclusively by wire.

The brake system may also perform braking operations in the absence of a driver braking demand, for example in the context of an autonomous cruise control system.

Therefore, the undesired effects of IPB activities can be compensated for before they lead to NVH problems. Further, the existing functions and control chains do not have to be modified.

By virtue of the fact that the volume displaced by the integrated parking brake is taken into consideration, the parking or standby position of the pressure piston or a linear actuator (LAC) can be newly determined. As a result, when the brake system switches to the by-wire mode, it is no longer necessary to deplete residual volume by way of an activation of valves.

If the rear axle is kept in an unpressurized state by the TCS, the displaced volume can be factored into the pressure models of the rear wheels. The pressure build-up caused by the integrated parking brake can be compensated by the wheel controller.

BRIEF DESCRIPTION OF THE DRAWINGS

The present disclosure will become more fully understood from the detailed description and the accompanying drawings, wherein.

DETAILED DESCRIPTION

In all of the figures, identical parts are denoted by the same reference designations.

Figure 1:
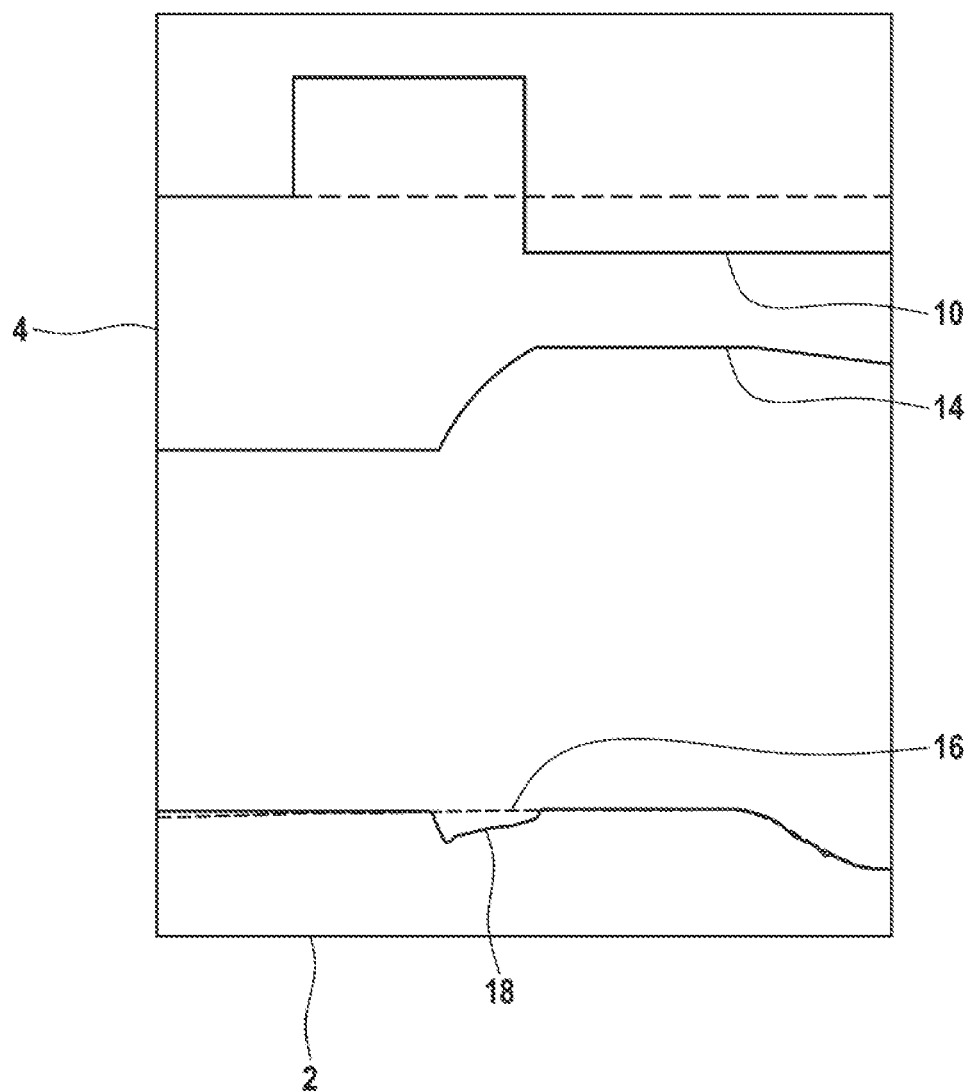
FIG. 1 shows a diagram of an integrated parking braking demand.

FIG. 1 illustrates, in a diagram, an example of an integrated parking braking demand. The time is plotted on the abscissa axis 2. On the ordinate, a signal flag, which represents a demand for an application of the integrated parking brake, is plotted as a curve 10 at the top, and a pressure piston position is plotted in the middle and the system pressure is plotted at the bottom.

Figure 2:
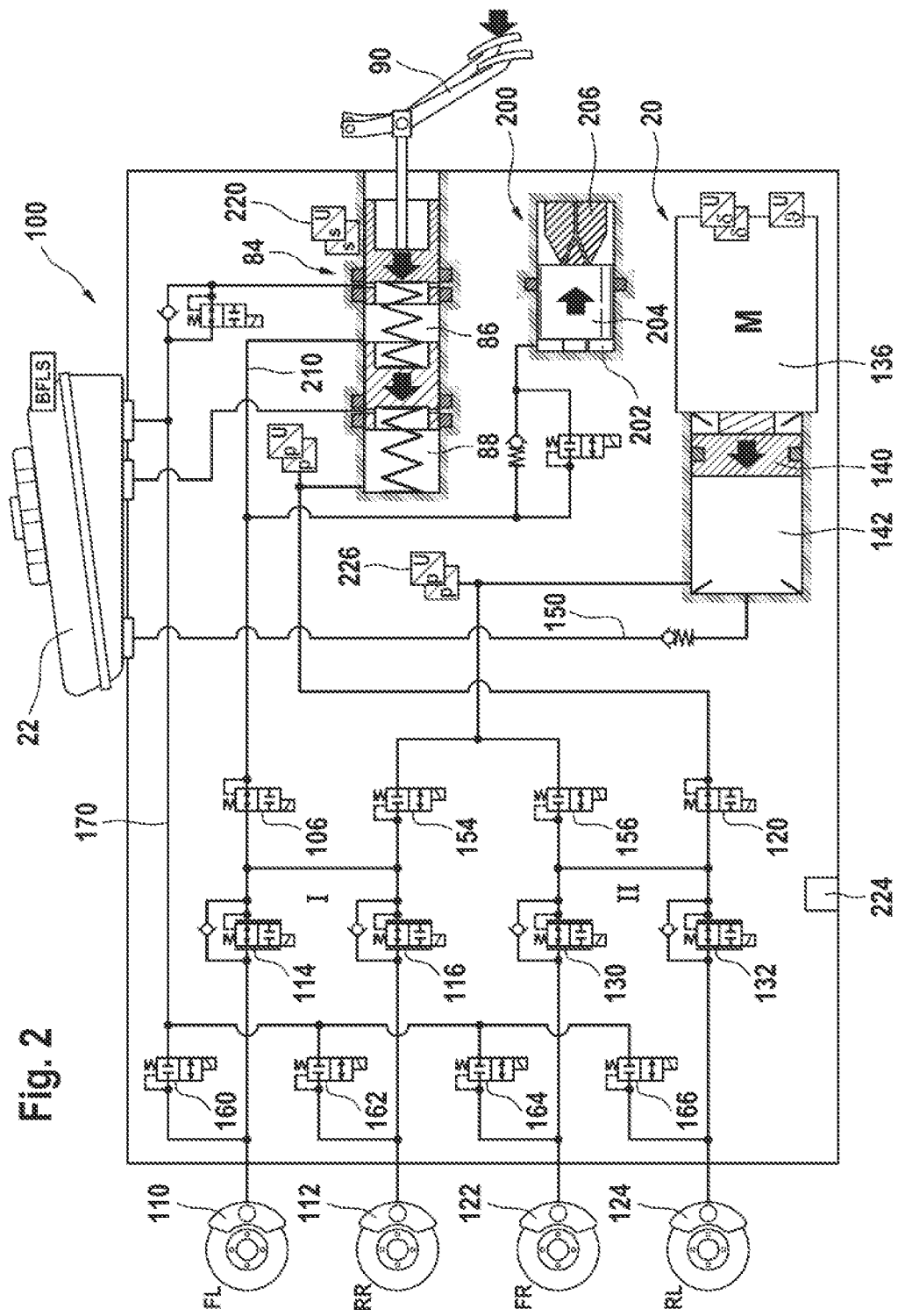
FIG. 2 shows an embodiment of a hydraulic circuit diagram of a brake system.

The course of the actual pressure, represented by a curve 18, shows the influence of the IPB on a brake system as illustrated in FIG. 2. As a result of the volume displacement caused by the application of the IPB, the pressure piston or a linear actuator (LAC) advances (see curve 14) in order to compensate for the brake volume displaced by the IPB. In this example, the LAC has had to change position by 4 mm. This corresponds to a volume displacement of approximately 1.2 $cm^3$. Before the LAC reaction, the pressure drop was approximately 2.5 bar. A curve 16 represents the setpoint system pressure, whereas a curve 18 represents the actual pressure.

FIG. 2 illustrates an embodiment of a brake system 100. The brake system 100 comprises a master brake cylinder 84 having two pressure chambers 86, 88. The master cylinder 84 is actuated by the driver of the motor vehicle via a brake pedal 90. The master brake cylinder 84 is connected to a pressure medium reservoir or brake fluid reservoir 22 and is supplied with pressure medium therefrom. Here, each of the pressure chambers 86, 88 has a dedicated connection to the pressure medium reservoir 2.

The first pressure chamber 86 of the master brake cylinder 84 is connected via a first isolation valve 106 to a first brake circuit I, to which a first and a second wheel brake 110, 112 are connected. According to the example, the first isolation valve 106 is configured to be normally open. Here, the first and second wheel brake 110, 112 are expediently connected via a respective inlet valve 114, 116.

The second pressure chamber 88 of the master brake cylinder 84 is connected via a second isolation valve 120 to a second brake circuit II, to which a third and a fourth wheel brake 122, 124 are connected. According to the example, the second isolation valve 120 is configured to be normally open. Here, the third and fourth wheel brake 122, 124 are expediently connected via a respective inlet valve 130, 132.

The brake system 100 has a pressure supply device 20, which is configured as a linear actuator (LAC). According to the example, the pressure supply device 20 comprises a motor 136, by means of which, via a rotation-translation mechanism 144, a pressure piston 140 can be displaced in a hydraulic pressure chamber 142 of a pressure supply device, whereby a system pressure can be built up. The pressure supply device 20 is connected via a connection 150 to the brake fluid reservoir 22 and is supplied with pressure medium therefrom.

According to the example, the pressure supply device 20 is separably connected via a first sequence valve 154 to the first and second wheel brake 110, 112 and separably connected via a second sequence valve 156 to the third and the fourth wheel brake 122, 124.

According to the example, the brake system 100 can be operated in a normal mode, which corresponds to a so-called "by-wire" mode. In the normal mode, the first and the second isolation valve 114, 132 are closed, with the result that the master brake cylinder 84 is decoupled from the wheel brakes 110, 112, 122, 124. The sequence valves 154, 156 are opened, and pressure in the wheel brakes is generated by the pressure supply device 20. The brake system 100 comprises a pedal feel simulator 200 with a hydraulic simulator chamber 202, a simulator piston 204 and an elastic element 206. In the by-wire mode, the simulator chamber is connected to the chamber 86 (primary chamber) of the master brake cylinder 84 in a hydraulically separable manner by a line 210. In the brake-by-wire mode, the driver's braking demand is detected by means of a pedal travel sensor 220. An open-loop and closed-loop control unit 224 adjusts the system pressure, which is measured by a system pressure sensor 226, accordingly.

In the normal mode, a pressure build-up by the pressure supply device 20 can be carried out even independently of an actuation of the brake pedal 90. Wheel brake pressure can be reduced at the wheel brakes 110, 112, 122, 124 by opening outlet valves 160, 162, 164, 166, via which the wheel brakes 110, 112, 122, 124 are connected to a common return line 170 and, via the latter, to the pressure medium reservoir 2. Alternatively, it is possible to provide separate return lines (not shown), with the first and second wheel brake 110, 112 being connected to a first return line and the third and fourth wheel brake 122, 124 being connected to a second return line. The return lines are connected to different chambers of the brake fluid reservoir 2.

The inlet valves 114, 116, 130, 132 are individually switchable to set different pressures in the wheel brakes. Braking control functions known per se (for example EBD, ABS, ASR, ESC, ACC, etc.) can be carried out by means of the brake system 100.

The brake system 100 can be operated in a first fallback operating mode. For this purpose, according to the example, the pressure supply device 20 is separated from the wheel brakes 110, 112, 122, 124 by virtue of the sequence valves 154, 156 being closed. The master brake cylinder 84 is hydraulically connected to the wheel brakes 110, 112, 122, 124 by virtue of the isolation valves 106, 120 being opened such that brake pressure is provided in the wheel brakes 110, 112, 122, 124 by the master brake cylinder 84. Here, the pressure supply device 20 is not used for pressure build-up.

Furthermore, the brake system 100 may also be operated in a second fallback operating mode in which, according to the example, the master brake cylinder 84 is separated from the wheel brakes 110, 112, 122, 124 by closing the isolation valves 106, 120, and the pressure supply device 20 is connected to at least some of the wheel brakes by virtue of the first sequence valve 154 and/or the second sequence valve 156 being opened. Brake pressure for actuating some of the wheel brakes is provided by the pressure supply device 20.

Here, brake pressure in the first and second wheel brake 110, 112 is provided by the pressure supply device 20 by virtue of the first sequence valve 154 being opened, or brake pressure in the third and fourth wheel brake 122, 124 is provided by the pressure supply device 20 by virtue of the second sequence valve 156 being opened, or pressure in all four wheel brakes is provided by virtue of both the first and the second sequence valve 154, 156 being opened. Depending on the design of the sequence valves, it can be useful to close, with a sequence valve, the respectively associated inlet valves at the same time. For example, when a pressure in the pressure supply device 20 exerts an opening action on the sequence valves.

According to the example, the first and second wheel brakes 110, 112 are arranged on different vehicle sides, e.g. on a diagonal. Accordingly, the third and fourth wheel brakes 122, 124 are also arranged on different sides of the vehicle. For example, the third wheel brake 122 is the front right wheel brake (FR), the fourth wheel brake 124 is the rear left wheel brake (RL), the first wheel brake 110 is the front left wheel brake (FL), and the second wheel brake 112 is the rear right wheel brake (RR). Other arrangements are also possible.

The brake system 100 has an integrated parking brake. The integrated parking brake comprises electromechanical actuators in each of the rear wheel brakes 112, 124, which electromechanical actuators are designed to apply and release the brake linings of the respective wheel brake 112, 124 as required. The parking brake is thus integrated into the respective wheel brake and is therefore denoted by the same reference designations 112, 124.

Figure 3:
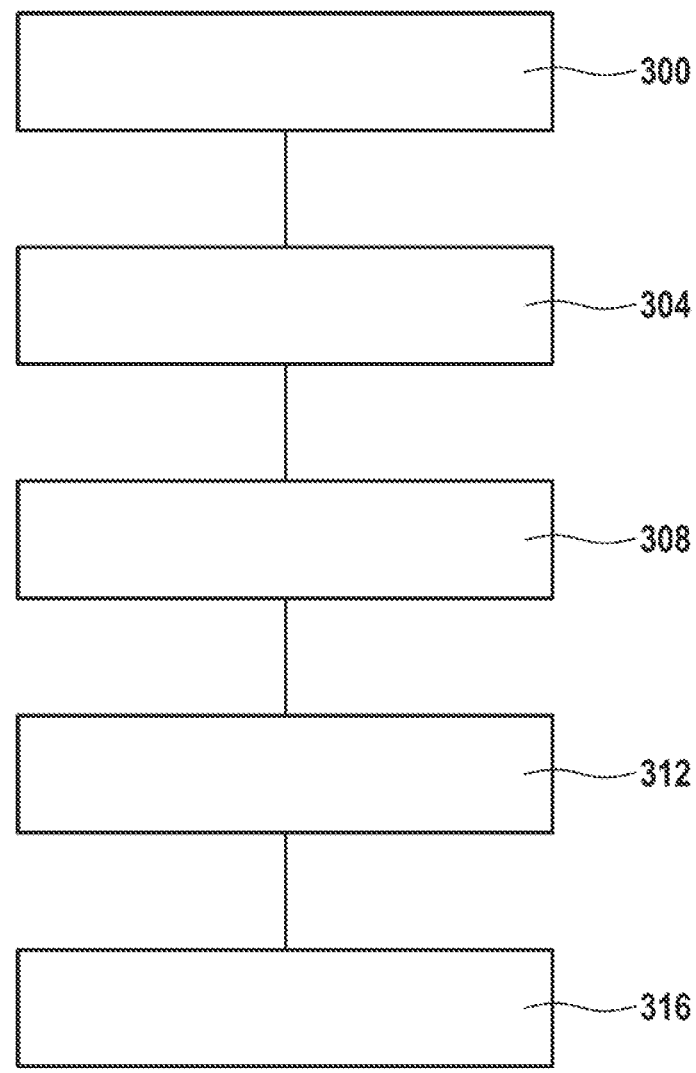
FIG. 3 shows a diagram of a first embodiment of a method of operating a brake system.

FIG. 3 shows a first embodiment of a method for operating the brake system 100 of a motor vehicle. The motor vehicle is in a state with the integrated parking brake (IPB) engaged or activated/applied. In a block 300, the motor vehicle is woken up.

In a block 304, the volume displaced by the integrated parking brake is calculated. From this, a movement travel of the pressure piston 140 of the pressure supply unit 20 is calculated, which corresponds to a new standby or park position of the pressure piston 140.

In a block 308, the pressure piston 140 is advanced to the newly calculated standby position. In the process, said pressure piston displaces the volume calculated in block 304 into the brake fluid reservoir 22. This takes place when the pressure chamber 142 is hydraulically connected to the reservoir 22.

In a block 312, the method waits until the driver presses the brake pedal 90 and releases the integrated parking brake.

If this has happened, then in a block 316, the method waits until the driver releases the brake pedal 90 again. As soon as this occurs, the pressure piston 140 is moved back into the original standby position. Since the movement of the pressure piston 140 to the new standby position causes a brake fluid volume to be displaced into the reservoir, which brake fluid volume corresponds exactly to the volume of brake fluid that is fed from the wheel brakes into the brake system after the integrated parking brake has been released, the brake system can be operated again with the original volume of brake fluid. "Blind" drainage of brake fluid after the integrated parking brake has been released is not necessary.

Figure 4:
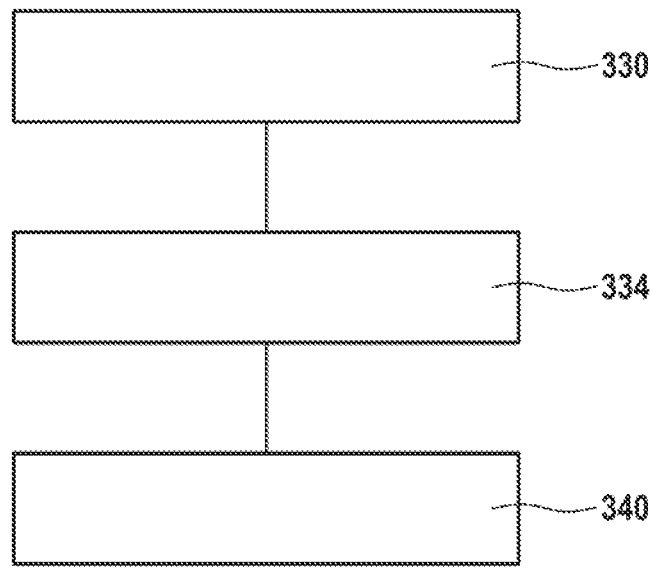
FIG. 4 shows a diagram of a second embodiment of a method of operating a brake system.

FIG. 4 illustrates a second embodiment of method of operating the brake system 100. In a block 330, the volume displaced by the integrated parking brake is calculated. In a subsequent block 334, the brake fluid volume displaced by the parking brake is taken into consideration in the pressure model of the respective wheel brake. For example, corrections are made in the pressure model with regard to one or more of the following variables: pressure-volume characteristic curve, admission pressure, caliper dimension, inlet valve state, isolation valve parameters.

In a block 340, if the pressure model now indicates a volume excess in the corresponding wheel brake 110, 112, 122, 124 or if the evaluation of the pressure model shows a volume excess, then the corresponding outlet valve 160, 162, 164, 166 is opened and the wheel brake pressure is thereby reduced.

As an example, the wheel brake 112 (RR) has a setpoint and actual pressure of 5 bar and the inlet valve 116 of this wheel brake 112 is closed because an admission pressure of 15 bar is present. The IPB displaces 0.75 cm$^3$ into this wheel brake 112. According to the PV characteristic curve, this additional volume would result in a pressure increase to 20 bar. In this case, a hydraulic connection with a check valve would cause an equalization of the pressure in wheel brake 112 and the system pressure (that is to say the pressure in pressure chamber 142), such that a pressure of 15 bar prevails in wheel brake 112. The wheel pressure controller of the open-loop and closed-loop control unit 224 would see an excess of 10 bar in the wheel and deplete the pressure by activating the outlet valve.

Figure 5:
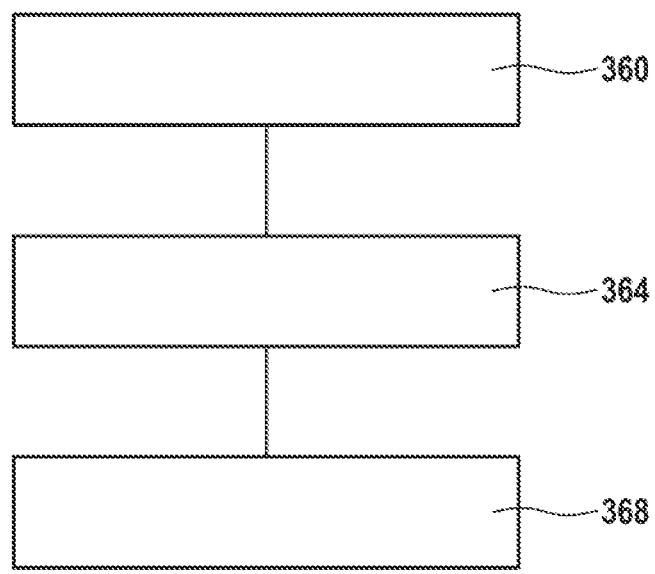
FIG. 5 shows a diagram of a third embodiment of a method of operating a brake system.

FIG. 5 illustrates a third embodiment of a method.

In a block 360, the volume displaced by the integrated parking brake is calculated and is factored into a stored pressure-volume characteristic curve (P-V characteristic curve). In a subsequent block 364, the newly calculated characteristic curve is compared with the stored characteristic curve.

In a block 368, the new (adapted) pressure-volume characteristic is used in monitoring of wheel volume deviations (Volume Deviation Monitoring—VDM).

The invention claimed is:

1. A method for operating a brake system comprising:
actively building and releasing brake pressure in a plurality of wheel brakes with a pressure supply device in a normal operating mode;
applying the brake linings of at least two of the plurality of wheel brakes with an integrated parking brake in a parking operating mode;
withdrawing application of the linings when the integrated parking brake is released;
determining brake fluid volume displaced by the integrated parking brake; and
resuming normal operating mode after the integrated parking brake has been released, and wherein the brake fluid volume displaced by the integrated parking brake is taken into consideration for the subsequent operation in the normal operating mode.

2. The method as claimed in claim 1, further comprising assuming a standby position by advancing a pressure piston of the pressure supply device in the direction of a pressure chamber such that the displacement volume corresponds to the parking brake displacement volume.

3. The method as claimed in claim 2, further comprising assuming a standby position of the pressure piston when the pressure piston is moved back out of the pressure chamber with the integrated parking brake activated.

4. The method as claimed in claim 2, further comprising closing a hydraulic connection to a brake fluid reservoir after the integrated parking brake has been released.

5. The method as claimed in claim 4, wherein the original standby position of the pressure piston is assumed after the hydraulic connection is closed.

6. The method as claimed in claim 1, further comprising considering the brake fluid volume displaced in at least one stored pressure-volume characteristic curve of the brake system.

7. The method as claimed in claim 6, further comprising considering the brake fluid volume displaced for a pressure model of the respective wheel brake in the pressure-volume characteristic curve thereof.

8. The method as claimed in claim 6, further comprising considering at least one of a plurality of wheel brake variables: admission pressure, caliper dimension, inlet valve state, isolation valve state, and outlet valve state.

9. The method as claimed in claim 6, further comprising opening of an outlet valve to reduce the wheel brake pressure in one of the wheel brakes when the pressure model indicates an excess of brake fluid in the respective wheel brake, such that the excess of brake fluid is depleted.

10. The method as claimed in claim 1, further comprising:
incorporating the brake fluid volume displaced by the integrated parking brake into a stored pressure-volume characteristic curve to create a new pressure-volume characteristic curve;
performing a comparison at least partially based on the new pressure-volume characteristic curve; and
using the new pressure-volume characteristic curve to monitor wheel volume deviations.

11. A brake system comprising:
a plurality of hydraulically actuatable wheel brakes;
a brake fluid reservoir;
a pressure supply device with a pressure piston that can be moved into a pressure chamber;
an integrated parking brake; and
an open-loop and closed-loop control unit having instructions for;
actively building and releasing brake pressure in a plurality of wheel brakes with a pressure supply device in a normal operating mode;
applying the brake linings of at least two of the plurality of wheel brakes with an integrated parking brake in a parking operating mode;
withdrawing application of the linings when the integrated parking brake is released; and
resuming normal operating mode after the integrated parking brake has been released, and wherein the brake fluid volume displaced by the integrated parking brake is taken into consideration for the subsequent operation in the normal operating mode.

12. The brake system as claimed in claim 11, wherein the pressure supply device is a linear actuator having an electric motor, and a rotation-translation mechanism for converting a motor rotation into a translational movement of the pressure piston.

13. The brake system as claimed in claim 12, wherein the rotation-translation mechanism a ball screw drive.

14. The brake system as claimed in claim 11, wherein a pressure piston of the pressure supply device advances in the direction of a pressure chamber such that the corresponding displacement volume corresponds to the parking brake displacement volume when in a standby position.

15. The brake system as claimed in claim 11, wherein the brake fluid volume displaced by the integrated parking brake is incorporated into a stored pressure-volume characteristic curve to create a new pressure-volume characteristic curve, a comparison at least partially based on the new pressure-volume characteristic curve is performed; and the new pressure-volume characteristic curve is used to monitor wheel volume deviations.

16. The brake system as claimed in claim 11, wherein at least one stored pressure-volume characteristic curve of the brake system is at least partially based on the brake fluid volume displaced.

17. The brake system as claimed in claim 16, wherein the brake fluid volume displaced is factored into a pressure model of the respective wheel brake in the pressure-volume characteristic curve thereof.

18. The brake system as claimed in claim 16, wherein at least one stored pressure-volume characteristic curve considers at least one of a plurality of wheel brake variables: admission pressure, caliper dimension, inlet valve state, isolation valve state, and outlet valve state.

19. The brake system as claimed in claim 16, wherein an outlet valve in one of the wheel brakes is open to reduce the wheel brake pressure when the pressure model indicates an excess of brake fluid in the respective wheel brake, such that the excess of brake fluid is depleted.

* * * * *